US010223383B2

(12) United States Patent
Lee (10) Patent No.: US 10,223,383 B2
(45) Date of Patent: Mar. 5, 2019

(54) USER EQUIPMENT, CONTROL METHOD THEREOF AND NON-TRANSITORY COMPUTER READABLE STORAGE MEDIUM HAVING COMPUTER PROGRAM RECORDED THEREON

(71) Applicant: SK Planet Co., Ltd., Gyeonggi-do (KR)

(72) Inventor: Gi Dong Lee, Seoul (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 217 days.

(21) Appl. No.: 15/222,521

(22) Filed: Jul. 28, 2016

(65) Prior Publication Data

US 2017/0185632 A1 Jun. 29, 2017

(30) Foreign Application Priority Data

Dec. 29, 2015 (KR) .......................... 10-2015-0188042

(51) Int. Cl.
*G06F 17/30* (2006.01)
*G06K 9/00* (2006.01)
*G06K 9/62* (2006.01)

(52) U.S. Cl.
CPC .... *G06F 17/30268* (2013.01); *G06F 17/3028* (2013.01); *G06F 17/30247* (2013.01); *G06F 17/30253* (2013.01); *G06F 17/30345* (2013.01); *G06F 17/30598* (2013.01); *G06K 9/00228* (2013.01); *G06K 9/00268* (2013.01); *G06K 9/00288* (2013.01); *G06K 9/6215* (2013.01)

(58) Field of Classification Search
CPC ......... G06F 17/30268; G06F 17/30247; G06F 17/30253; G06F 17/3028; G06F 17/30345; G06F 17/30598; G06K 9/00228; G06K 9/00268; G06K 9/00288; G06K 9/6215
USPC .......................................................... 707/609
See application file for complete search history.

(56) References Cited

U.S. PATENT DOCUMENTS

| 7,551,755 | B1 * | 6/2009 | Steinberg | ........... G06K 9/00228 340/5.53 |
| 2006/0251292 | A1 * | 11/2006 | Gokturk | ............ G06F 17/30253 382/103 |
| 2009/0279794 | A1 * | 11/2009 | Brucher | ............ G06F 17/30241 382/225 |
| 2011/0043437 | A1 * | 2/2011 | Tang | ................. G06F 17/30247 345/55 |

(Continued)

FOREIGN PATENT DOCUMENTS

KR   10-2010-0129725 A   12/2010

*Primary Examiner* — Evan Aspinwall
(74) *Attorney, Agent, or Firm* — Fenwick & West LLP (57) ABSTRACT

Provided are user equipment, a control method thereof and a non-transitory computer readable storage medium having a computer program recorded thereon. That is, according to the present invention, an image at a specific time is searched by identifying and tracking a person included in a corresponding reference image among a plurality of images photographed at a predetermined time different than a photographing time of the corresponding reference image by using the reference image, and a search result is provided or the images are classified according to the search result to conveniently acquire a desired image search result through the reference image, thereby improving convenience of a user.

9 Claims, 5 Drawing Sheets

(56) References Cited

U.S. PATENT DOCUMENTS

2015/0294157 A1\* 10/2015 Hasegawa ............. G01B 11/00
382/153

\* cited by examiner

| | 1 MONTH | 2 MONTHS | 3 MONTHS | 4 MONTHS | 5 MONTHS | 6 MONTHS | 7 TO 12 MONTHS | 1 TO 2 YEARS OLD | 3 TO 4 YEARS OLD | 5 TO 7 YEARS OLD | 8 TO 15 YEARS OLD | 16 TO 20 YEARS OLD | 21 TO 30 YEARS OLD | 31 TO 40 YEARS OLD |
|---|---|---|---|---|---|---|---|---|---|---|---|---|---|---|
| 1ST STEP | | | | | | | | | | | | 15 | | |
| 2ND STEP | | | | | | | | | | | 10 | 13 | | |
| 3RD STEP | | | | | | | | | | 15 | 11 | | | |
| 4TH STEP | | | | | | | | | 9 | 12 | | | | |
| 5TH STEP | | | | | | | | 21 | 11 | | | | | |
| 6TH STEP | | | | | | | 37 | 32 | | | | | | |
| 7TH STEP | | | | | | 33 | 25 | | | | | | | |
| 8TH STEP | | | | | 8 | 32 | | | | | | | | |
| 9TH STEP | | | | 11 | 9 | | | | | | | | | |
| 10TH STEP | | | 8 | 15 | | | | | | | | | | |
| 11TH STEP | | 4 | 3 | | | | | | | | | | | |
| 12TH STEP | 5 | 0 | | | | | | | | | | | | |
| 13TH STEP | | | | | | | | | | | | | | |
| 14TH STEP | | | | | | | | | | | | | | |

USER EQUIPMENT, CONTROL METHOD THEREOF AND NON-TRANSITORY COMPUTER READABLE STORAGE MEDIUM HAVING COMPUTER PROGRAM RECORDED THEREON

CROSS-REFERENCE TO RELATED APPLICATION

This application claims the benefit of Korean Application No. 10-2015-0188042 filed on Dec. 29, 2015 with the Korean Intellectual Property Office, the disclosure of which is incorporated herein by reference.

BACKGROUND OF THE INVENTION

1. Field of the Invention

The present invention relates to user equipment, control method thereof and a non-transitory computer readable storage medium having a computer program recorded thereon, and particularly, to user equipment, control method thereof and a non-transitory computer readable storage medium having a computer program recorded thereon which search an image at a specific time by identifying and tracking a person included in a corresponding reference image among a plurality of images photographed at a predetermined time different than a photographing time of the corresponding reference image by using the reference image, and provide a search result or classify the images according to the search result.

2. Description of the Related Art

A current image automatic tagging method adopts a scheme that determines whether the same person is present in a plurality of photographs based on a feature point of a person acquired from a reference image to tag whether a person corresponding to the reference image is present through the photograph when the same person is present in the plurality of photographs.

In recent years, under a situation in which multimedia photographing is routinized, enormously generated images are stored in a cloud server or a mass storage medium and manually classifying the generated images is not easy. Accordingly, a technology that automatically classifies the images appears, and as a result, when the images are classified into babies, adults, animals, landscapes, and the like or a tag is set by selecting a person of a specific photograph, a photograph in which a person having a similar feature to the corresponding person is present may be automatically identified and tagged.

However, utilization of classification based on a simple criterion is limitative and in even a method that tags the person, a photograph at a similar time to the selected reference tag can be searched, but a person which is changed with the passage of time is not automatically tracked and found.

An expected photograph for a case in which the person becomes the adult from a childhood photograph based on average face change data for specific sex and race may be generated in order to search missing children, but a feature disappears as the time elapses by reflection of average information and identifiability is lowered, and as a result, it is difficult to apply such a scheme to automatic image tagging.

PRIOR ART DOCUMENTS

Patent Document

Korean Patent Publication No. 10-2010-0129725 [Title: Searching system and searching service method]

SUMMARY OF THE INVENTION

An object of the present invention is to provide user equipment, control method thereof and a non-transitory computer readable storage medium having a computer program recorded thereon which search an image at a specific time by identifying and tracking a person included in a corresponding reference image among a plurality of images photographed at a predetermined time different than a photographing time of the corresponding reference image by using the reference image, and provide a search result or classify the images according to the search result.

Another object of the preset invention is to provide user equipment, control method thereof and a non-transitory computer readable storage medium having a computer program recorded thereon which track and automatically tag an associated person while reflecting a feature of a face which is changed only by an image at a single time when images which are changed with the passage of time are accumulated.

Yet another object of the present invention is to provide user equipment, control method thereof and a non-transitory computer readable storage medium having a computer program recorded thereon which find, when a vast image pool such as the Internet is present even in the case where an image of the same person is not present for each time period, similar faces from the corresponding images and reflect a change of the corresponding similar faces over time to find the same person which is the same as a reference image from photographs at a substantially desired time.

According to an aspect of the present invention, user equipment includes: a storage unit storing a plurality of images classified for each time interval based on photographing dates included in metadata of the plurality of images, respectively, and time information associated with the plurality of images; and a control unit setting a tag including an age and an identifier in a reference image, performing a first image tagging function between the reference image and a plurality of images included in a first time interval which is the same time interval as the reference image among the plurality of images for each time interval, extracting feature information of objects included in images having similarities of a reference value or more, respectively based on images of which the similarities by performing the first image tagging function are the reference value or more, and reflecting the extracted feature information of the objects included in the images having the similarities of the reference value or more, respectively to feature information of the reference image to update the feature information of the reference image to be searched.

In an embodiment of the present invention, the control unit may calculate each of similarities between a face which is the object included in the reference image and faces which are the objects included in the plurality of images included in the first time interval, respectively based on the tag set in the reference image and verify images in which the calculated similarity for each of the plurality of images is a predetermined reference value or more.

In an embodiment of the present invention, the control unit may perform a second image tagging function between the reference image of which the feature information is updated and the plurality of images included in a first time interval, perform a third image tagging function between the reference image of which the feature information is updated and a plurality of other images included in a second time interval consecutive with the first time interval including the reference image among the plurality of images for each time interval, and reflect the feature information of the objects included in one or more images having the similarities of the reference value or more, respectively, to the feature information of the reference image of which the feature information is updated based on one or more images in which similarities by performing the second image tagging function and the third image tagging function is the reference value or more again to reupdate the feature information of the reference image of which the feature information to be searched is updated.

In an embodiment of the present invention, the control unit may repeatedly perform the calculation of the similarities between at least one image included in two consecutive time intervals and the reference image of which the feature information is updated and the process of updating the feature information of the reference image with respect to the plurality of images classified for each time interval to search each of one or more images in which the similarities are the reference value or more for each time interval with respect to the plurality of images classified for each time interval.

In an embodiment of the present invention, the control unit may classify one or more images searched for each time interval, for each time interval, and control the classified one or more images searched for each time interval and the number of images searched for each time interval to be displayed on a display unit.

In an embodiment of the present invention, the control unit may classify both of first one or more images and second one or more images searched through the consecutive searches, respectively with respect to the same time interval into images of the same time interval at the time of classifying one or more images searched for each time interval for each time interval.

In an embodiment of the present invention, the control unit may classify at least one image commonly included among both of first one or more images and second one or more images searched through the consecutive searches, respectively with respect to the same time interval into the images of the same time interval at the time of classifying one or more images searched for each time interval for each time interval.

According to another aspect of the present invention, a control method of user equipment includes: storing, by a storage unit, a plurality of images classified for each time interval based on photographing dates included in metadata of the plurality of images, respectively and time information associated with the plurality of images; setting, by a control unit, a tag including an age and an identifier in a reference image; performing, by the control unit, a first image tagging function between the reference image and a plurality of images included in a first time interval which is the same time interval as the reference image among the plurality of images for each time interval; extracting, by the control unit, feature information of objects included in images having similarities of a reference value or more, respectively based on images of which the similarities by performing the first image tagging function are the reference value or more; and reflecting, by the control unit, the extracted feature information of the objects included in the images having the similarities of the reference value or more, respectively to feature information of the reference image to update the feature information of the reference image to be searched.

In an embodiment of the present invention, the performing of the first image tagging may function include calculating, by the control unit, each of similarities between a face which is the object included in the reference image and faces which are the objects included in the plurality of images included in the first time interval, respectively based on the tag set in the reference image; and verifying, by the control unit, images in which the calculated similarity for each of the plurality of images is a predetermined reference value or more.

In an embodiment of the present invention, the method may further include: performing, by the control unit, a second image tagging function between the reference image of which the feature information is updated and the plurality of images included in a first time interval and performing a third image tagging function between the reference image of which the feature information is updated and a plurality of other images included in a second time interval consecutive with the first time interval including the reference image among the plurality of images for each time interval; reflecting, by the control unit, the feature information of the objects included in one or more images having the similarities of the reference value or more to the feature information of the reference image of which the feature information is updated based on one or more images in which similarities by performing the second image tagging function and the third image tagging function is the reference value or more again to reupdate the feature information of the reference image of which the feature information to be searched is updated; repeatedly performing, by the control unit, the calculation of the similarities between at least one image included in two consecutive time intervals and the reference image of which the feature information is updated and the process of updating the feature information of the reference image with respect to the plurality of images classified for each time interval to search each of one or more images in which the similarities are the reference value or more for each time interval with respect to the plurality of images classified for each time interval; classifying, by the control unit, one or more images searched for each time interval, for each time interval; and displaying, by the display unit, the classified one or more images searched for each time interval and the number of images searched for each time interval.

According to yet another aspect of the present invention, a computer program executing the method according to the aforementioned embodiment may be stored in a non-transitory computer readable storage medium having a computer program recorded thereon.

According to the present invention, an image at a specific time is searched by identifying and tracking a person included in a corresponding reference image among a plurality of images photographed at a predetermined time different than a photographing time of the corresponding reference image by using the reference image, and a search result is provided or the images are classified according to the search result to conveniently acquire a desired image search result through the reference image, thereby improving convenience of a user.

Further, when images which are changed with the passage of time are accumulated, an associated person is tracked and automatically tagged while reflecting a feature of a face which is changed only by an image at a single time to easily classify or search images stored in a cloud server or easily classify or associate images stored in various mass storage media.

In addition, according to the present invention, when a vast image pool such as the Internet is present even in the case where an image of the same person is not present for each time period, similar faces are found from the corresponding images and a change of the corresponding similar faces over time is reflected to find the same person which is the same as a reference image from photographs at a substantially desired time, and as a result, it is available when there is not many images or missing children are found.

DETAILED DESCRIPTION OF THE PREFERRED EMBODIMENTS

It is noted that technical terms used in the present invention are used to just describe a specific embodiment and do not intend to limit the present invention. Further, if the technical terms used in the present invention are not particularly defined as other meanings in the present invention, the technical terms should be appreciated as meanings generally appreciated by those skilled in the art and should not be appreciated as excessively comprehensive meanings or excessively reduced meanings. Further, when the technical term used in the present invention is a wrong technical term that does not accurately express the spirit of the present invention, the technical term should be understood by being substituted by a technical term which can be correctly understood by those skilled in the art. In addition, a general term used in the present invention should be interpreted as defined in a dictionary or contextually, and should not be interpreted as an excessively reduced meaning.

In addition, singular expressions used in the present invention include plurals expressions unless they have definitely opposite meanings. In the present invention, it should not analyzed that a term such as "comprising" or "including" particularly includes various components or various steps disclosed in the specification and some component or some steps among them may not included or additional components or steps may be further included.

In addition, terms including ordinal numbers, such as 'first' and 'second', used in the present invention can be used to describe various components, but the components should not be limited by the terms. The above terms are used only to discriminate one component from the other components. For example, a first component may be named a second component and similarly, the second component may also be named the first component, without departing from the scope of the present invention.

Hereinafter, preferable exemplary embodiment of the present invention will be described in more detail with reference to the accompanying drawings. Like reference numerals refer to like elements for easy overall understanding and a duplicated description of like elements will be omitted.

Further, in the following description, a detailed explanation of known related technologies may be omitted to avoid unnecessarily obscuring the subject matter of the present invention. Further, it is noted that the accompanying drawings are only for easily understanding the spirit of the present invention and it should not be interpreted that the spirit of the present invention is limited by the accompanying drawings.

Figure 1:
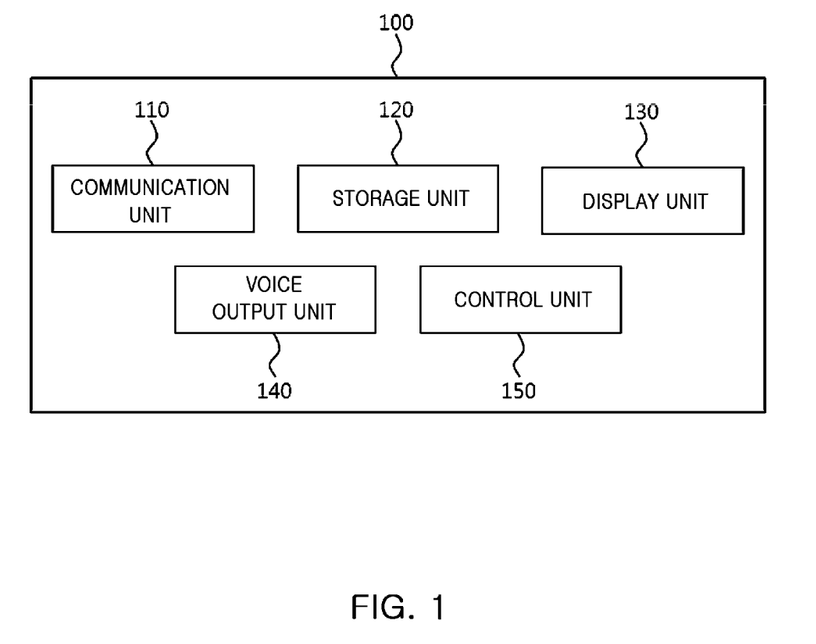
FIG. 1 is a block diagram illustrating a configuration of user equipment according to an embodiment of the present invention.

FIG. 1 is a block diagram illustrating a configuration of user equipment 100 according to an embodiment of the present invention.

As illustrated in FIG. 1, the user equipment 100 is constituted by a communication unit 110, a storage unit 120, a display unit 130, a voice output unit 140, and a control unit 150. All the components of the user equipment 100 illustrated in FIG. 1 are not required components, and the user equipment 100 may be implemented by more components than the components illustrated in FIG. 1 or less components therethan.

The control unit 150 performs an image tagging function among a plurality of images included in the same time interval as a predetermined reference image in which a tag including an age and an identifier is set among a plurality of classified images according to a plurality of time intervals stored in the storage unit 120, respectively. Thereafter, the control unit 150 reflects feature information acquired from one or more images similar to the corresponding reference image by performing the image tagging function to feature information of the reference image to update search target image feature information. Then, the control unit 150 performs the image tagging function between images of which feature information is updated with respect to a next time interval adjacent to the corresponding time interval as the searched search interval and the corresponding time interval as the searched search interval. Thereafter, the control unit 150 reflects feature information acquired from one or more other images similar to the corresponding reference image by performing the image tagging function to the feature information of the reference image to update the search target image feature information. Further, the control unit 150 repeatedly performs the image tagging function for a current time interval and the next time interval with respect to the plurality of time intervals to search images similar to the corresponding reference image depending on calculation of a similarity between the images in the plurality of all time intervals and the reference image for each time interval. Thereafter, the control unit 150 performs a classification function of the images searched for each time interval and displays the images classified for each time interval by performing the classification function, the number of the images classified for each time interval, and the like on the display unit 130.

The user equipment 100 may be applied to various terminals such as a smart phone, a portable terminal, a mobile terminal, a personal digital assistant (PDA), a portable multimedia player (PMP), a telematics terminal, a navigation terminal, a personal computer, a notebook computer, a slate PC, a tablet PC, an ultrabook, a wearable device (for example, including a smartwatch, a smart glass, a head mounted display (HMD), and the like), a Wibro terminal, an Internet protocol television (IPTV) terminal, a smart TV, a digital broadcasting terminal, a television, a 3D television, a home theater system, an audio video navigation (AVN) terminal, an audio/video (A/V) system, and a flexible terminal, and the like.

The communication unit 110 communicates with any internal component or at least one predetermined external terminal via a wired/wireless communication network. In this case, any external terminal may include a service providing device (not illustrated), a cloud server (not illustrated), a mass storage medium (not illustrated), and the like. Herein, a wireless Internet technology includes wireless LAN (WLAN), digital living network alliance (DLNA), wireless broadband (Wibro), world interoperability for microwave access (Wimax), high speed downlink packet access (HSDPA), high speed uplink packet access (HSUPA), IEEE 802.16, long term evolution (LTE), long term evolution-advanced (LTE-A), wireless Mobile broadband service (WMBS), and the like and the communication unit 110 transmits/receives data according to at least one wireless Internet technology in a range to include even Internet technologies not enumerated as above. Further, a short-range communication technology may include Bluetooth, radio frequency identification (RFID), infrared data association (IrDA), ultra wideband (UWB), ZigBee, near field communication (NFC), ultra sound communication (USC), visible light communication (VLC), Wi-Fi, Wi-Fi direct, and the like. In addition, a wired communication technology may include power line communication (PLC), USB communication, Ethernet, serial communication, optical/coaxial cable, and the like.

Further, the communication unit 110 may mutually transmit information a predetermined terminal through a universal serial bus (USB).

Further, the communication unit 110 transmits and receives a wireless signal to and from at least one of a base station, the service proving device, the cloud server, the mass storage medium, and the like on a mobile communication network constructed according to technical standards for mobile communication or communication schemes (for example, global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), IEEE 802.16, long term evolution (LTE), long term evolution-advanced (LTE-A), or the like).

Further, the communication unit 110 communicates with the cloud server, the mass storage medium, and the like by the control of the control unit 150.

Further, the communication unit 110 stores a plurality of images provided from the cloud server, the mass storage medium, and the like by the control of the control unit 150.

The storage unit 120 stores various user interfaces (UIs), graphic user interfaces (GUIs), and the like.

Further, the storage unit 120 stores data, programs, and the like which are required to operate the user equipment 100.

That is, the storage unit 120 may store a plurality of application programs (alternatively, applications) driven in the user equipment 100 and data, commends, and the like for the operation of the user equipment 100. At least some of the application programs may be downloaded from an external service providing device through wireless communication. Further, at least some of the application programs may be present on the user equipment 100 from a delivery time for base functions (for example, phone receipt and call functions and message receiving and sending functions) of the user equipment 100. Meanwhile, the application program is stored in the storage unit 120 and installed in the user equipment 100 to be driven to perform an operation (alternatively, a function) of the user equipment 100 by the control unit 150.

Further, the storage unit may include at least one storage medium of a flash memory type, a hard disk type, a multimedia card micro type, a card type memory (for example, an SD or XD memory, or the like), a magnetic memory, a magnetic disk, an optical disk, a random access memory (RAM), a static random access memory (SRAM), a read-only memory (ROM), an electrically erasable programmable read-only memory (EEPROM), and a programmable read-only memory (PROM). Further, the user equipment 100 may operate a web storage performing a storage function of the storage unit 120 on the Internet or operate in association with the web storage.

Further, the storage unit 120 stores various information, the plurality of images, and the like received through the communication unit 110 by the control of the control unit 150.

The display unit 130 may display various contents such as various menu screens, and the like by using the UI and/or the GUI stored in the storage unit 120 by the control of the control unit 150. Herein, the contents displayed on the display unit 130 include a menu screen including various texts or image data (including various information data) and data such as icons, a list menu, and a combo box, and the like. Further, the display unit 130 may be a touch screen.

In addition, the display unit 130 may include at least one of a liquid crystal display (LCD), a thin film transistor-liquid crystal display (TFT LCD), an organic light-emitting diode (OLED), a flexible display, a 3D display, an e-ink display, and a light emitting diode (LED).

Further, the display unit 120 may be constituted as a stereoscopic display unit displaying a stereoscopic image.

A 3D display type such as a stereoscopic type (a glasses type), an auto-stereoscopic type (a glassless type), a projection type (a holographic type), and the like may be applied to the stereoscopic display unit.

Further, the display unit 130 displays various pieces of information, the plurality of images, and the like received through the communication unit 110 by the control of the control unit 150.

The voice output unit 140 outputs voice information included in a signal signal-processed by the control unit 150. Herein, the voice output unit 140 may include a receiver, a speaker, a buzzer, and the like.

Further, the voice output unit 140 outputs a guidance voice generated by the control unit 150.

In addition, the voice output unit 140 outputs voice information corresponding to various pieces of information received through the communication unit 110 by the control of the control unit 150.

The control unit 150 executes an overall control function of the user equipment 100.

Further, the control unit 150 executes an overall control function of the user equipment 100 by using the programs and data stored in the storage unit 120. The control unit 150 may include a RAM, a ROM, a CPU, a GPU, and a bus, and the RAM, the ROM, the CPU, the GPU, and the like may be connected to each other through the bus. The CPU accesses the storage unit 120 to perform booting by using an O/S stored in the storage unit 120 and may perform various operations by using various programs, contents, data, and the like stored in the storage unit 120.

Further, the control unit 110 receives mass images provided from the service providing device, the cloud server, the mass storage medium, and the like through the communication unit.

In addition, the control unit 150 verifies (alternatively, selects) the reference image among the plurality of images stored in the storage unit 120.

Moreover, the control unit 150 sets the tag including the age and the identifier in the reference image.

In addition, the control unit 150 classifies the plurality of images according to the time interval based on photographing dates included in metadata of the plurality of images stored in the storage unit 120, respectively and time information (for example, a registration time in a webpage, SNS, or the like) associated with the plurality of corresponding images.

In this case, the control unit 150 may narrow the time interval for the search in the case of a childhood in which a change degree of a face is large according to the age. To this end, the control unit 150 preferably accurately sets (alternatively, inputs) the age (alternatively, a date of birth) of the reference image. For example, the control unit 150 may variably set the search interval like setting the search interval to 1 month and gradually increasing the search interval to 2 to 3 months in the case of children, setting the search interval to 1 year in the case of 10 years old or more, setting the search interval to 2 years in the case of 20 years old or more, setting the search interval to 5 years in the case of 30 years old or more, and the like.

Further, the control unit 150 performs the image tagging function between the reference image and the plurality of images included in the same time interval as the corresponding reference image among the plurality of images for each time interval.

That is, the control unit 150 calculates each of similarities between the face which is an object included in the reference image and faces which are objects included in the plurality of images included in the same time interval as the corresponding reference image, respectively with respect to the plurality of images included in the same time interval as the reference image among the plurality of time intervals based on the tag set in the reference image and verifies an image in which the calculated similarity for each of the plurality of images is a predetermined reference value or more.

Further, the control unit 150 verifies (alternatively, extracts) feature information of objects included in the images of which the similarity is the reference value or more, respectively based on the images of which the verified similarity is the predetermined reference value or more.

In addition, the control unit 150 reflects the feature information of the objects included in the images of which the verified similarity is the reference value or more, respectively to the feature information of the reference image to update the feature information of the reference image to be searched.

Moreover, the control unit 150 performs the image tagging function between the reference image (alternatively, the reference image of which the feature information is updated), and the plurality of images included in the same time interval as the reference image among the plurality of images for each time interval and a plurality of other images included in an adjacent time interval of a search time direction from the same time interval as the corresponding reference image.

That is, the control unit 150 calculates each of similarities between the face which is the object included in the reference image and faces which are the objects included in the plurality of images included in the same time interval as the corresponding reference image and the plurality of other images included in the adjacent time interval of the search time direction from the same time interval as the corresponding reference image with respect to the plurality of images included in the same time interval as the reference image among the plurality of images for each time interval and the plurality of other images included in the adjacent time interval of the search time direction from the same time interval as the corresponding reference image based on the tag set in the reference image and verifies images in which the calculated similarity for each of the plurality of images and the calculated similarity for each of the plurality of other images are a predetermined reference value or more. In this case, the control unit 150 may calculate each of the similarities for the corresponding reference image, the plurality of images included in the same time interval as the reference image and the plurality of other images included in the adjacent time interval of the search time direction based on the feature information of the reference image updated in the above step with respect to the reference image.

Further, the control unit 150 verifies the feature information of the objects included in the images of which the similarity is the reference value or more, respectively based on the images of which the verified similarity is the predetermined reference value or more.

In addition, the control unit 150 reflects the feature information of the objects included in the images of which the verified similarity is the reference value or more, respectively to the feature information of the reference image to update the feature information of the reference image to be searched again.

Moreover, the control unit 150 repeatedly performs the calculation of the similarity with the reference image of which the feature information is updated and the update of the feature information of the reference image with respect to a plurality of yet other images included in the time interval at the previous step and yet another time interval adjacent to the time interval at the corresponding previous step among the plurality of time intervals to search each of one or more images of which the similarity is the reference value or more with respect to the plurality of images included in the plurality of time intervals.

That is, the control unit 150 searches images similar to the reference image of which the feature information is updated while moving every one time interval based on the time interval corresponding to the corresponding reference image with respect to the plurality of time intervals.

As described above, as the method that reflects feature information of a subsequent search interval to the feature information (alternatively, a feature point), the control unit 150 performs the search based on the same feature information of a current interval and a next interval while searching and extracts the feature information for an image found in the next interval again to repeat a scheme that performs the search in the next interval and the subsequent interval.

Therefore, a specific person may be found at once among personal images which are accumulated for several years in spite of a change of the corresponding person (for example, an image of a current family is selected among family photographs accumulated for dozens of years and even a childhood photograph of the corresponding family member is collectively tagged) or a scheme is repeated, which tags an image identified as the same person at the same time is tagged in an Internet image or a separate image pool when there is little accumulated photographs of an explicit target and thereafter, updates a feature to find an image including the expected same person at a desired time.

Further, the control unit 150 finds an image in which a similar face is present when there is no metadata for the photographing date among personal photographs to provide an approximate photographing time of the corresponding image, find missing children among the Internet images, and provide a prediction image of the face after growth.

In addition, the control unit 150 automatically classifies one or more images searched for the plurality of time intervals for each time interval, respectively and displays the one or more automatically classified images searched for the plurality of time intervals, respectively, the number of the images searched for each of the plurality of time intervals, and the like on the display unit 130.

In this case, when the one or more images searched for the plurality of time intervals, respectively are automatically classified for each time interval, the control unit 150 classifies all images into the image of the corresponding time interval with respect to the images searched through the consecutive steps, respectively.

Further, when the one or more images searched for the plurality of time intervals, respectively are automatically classified for each time interval, the control unit 150 classifies the image commonly included in the steps among the images searched through the consecutive steps, respectively into the image of the corresponding time interval.

In the embodiment of the present invention, it is described that the user equipment 100 searches and classifies the image for each time interval, which is similar to the reference image for the plurality of images (alternatively, the plurality of images classified for each time interval) provided from the cloud server, the mass storage medium, and the like, but the present invention is not limited thereto and the user equipment 100 may transmit the reference image to the cloud server or the mass storage medium, and the corresponding cloud server or mass storage medium may search and classify the image for each time interval, which is similar to the reference image and thereafter, provide the searched and classified image for each time interval to the user equipment 100.

Further, the user equipment 100 may further include an interface unit (not illustrated) serving as an interface with all external devices connected to the corresponding user equipment 100. For example, the interface unit may be constituted by a wired/wireless headset port, an external charger port, a wired/wireless data port, a memory card port, a port connecting devices with identification modules, an audio input/output (I/O) port, a video input/output (I/O) port, an earphone port, and the like. Here, the identification module is a chip storing various information for authenticating a permission of the user equipment 100 and may include a user identity module (UIM), a subscriber identity module (SIM), a universal subscriber identity module (USIM), and the like. Further, the device provided with the identification module may be prepared in a smart card form. Accordingly, the identification module may be connected with the user equipment 100 through the port. Such an interface unit receives data or power from an external device to transmit the received data or power to each component in the user equipment 100 or transmit the data in the user equipment 100 to the external device.

Further, the interface unit may be a passage through which the power from a cradle is supplied to the corresponding user equipment 100 when the user equipment 100 is connected with an external cradle or a passage through which various command signals input from the cradle by the user is transferred to the corresponding user equipment 100. Various command signals input from the cradle or the corresponding power may also operate by a signal for recognizing that the user equipment 100 is accurately installed on the cradle.

Further, the user equipment 100 may further include an input unit (not illustrated) for receiving a signal according to a button operation of the user or any function selection or receiving a command or a control signal generated by an operation such as touching/scrolling the displayed screen.

The input unit as a means for receiving at least one of a user's command, selection, data, and information may include a plurality of input keys and function keys for receiving figure or text information and setting various functions.

Further, as the input unit, various devices may be used, such as a key pad, a dome switch, a (capacitive/resistive) touch pad, a touch screen, a jog wheel, a jog switch, a jog shuttle, a mouse, a stylus pen, a touch pen, and the like. Particularly, when the display unit 130 is formed in a touch screen form, some or all of the input functions may be performed by the display unit 130.

Further, each component (alternatively, each module) of the user equipment 100 may be software stored on a memory (alternatively, the storage unit 120) of the user equipment 100. The memory may be an internal memory of the user equipment 100 and may an external memory or other types of storage devices. Further, the memory may be a non-volatile memory. The software stored on the memory may include a command set to allow the user equipment 100 to perform a specific operation while executing.

Further, a processor installed in the user equipment 100 according to the present invention may process the program command for executing the method according to the present invention. In one implementation example, the processor may be a single-threaded processor and in another implementation example, the processor may be a multi-threaded processor. Furthermore, the processor may process a command stored in the memory or a storage device.

As described above, an image at a specific time may be searched by identifying and tracking a person included in a corresponding reference image among a plurality of images photographed at a predetermined time different than a photographing time of the corresponding reference image by using the reference image, and a search result may be provided or the images may be classified according to the search result.

Further, when the images which are changed with the passage of time are accumulated, an associated person may be tracked and automatically tagged while reflecting a feature of a face which is changed only by an image at a single time.

Further, when a vast image pool such as the Internet is present even in the case where an image of the same person is not present for each time period, similar faces are found from the corresponding images and a change of the corresponding similar faces over time is reflected to find the same person which is the same as a reference image from photographs at a substantially desired time.

Hereinafter, a control method of the user equipment according to the present invention will be described in detail with reference to FIGS. 1 to 5.

Figure 2:
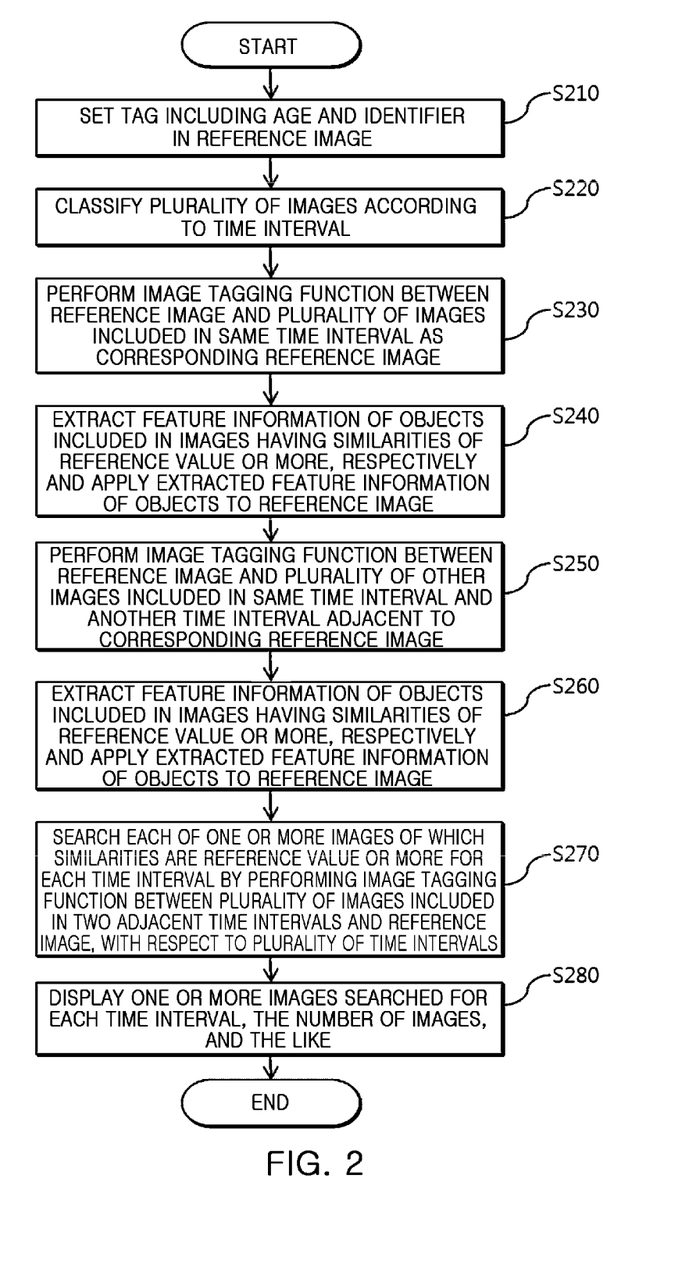
FIG. 2 is a flowchart illustrating a control method of user equipment according to an embodiment of the present invention.

FIG. 2 is a flowchart illustrating a control method of user equipment according to an embodiment of the present invention.

First, the control unit 150 sets the tag including the age and the identifier in the reference image.

As an example, the control unit 150 sets a tag including an age (for example, 17 years old) and an identifier in a reference image including the face of a first user (S210).

Thereafter, the control unit 150 classifies the plurality of images according to the time interval based on photographing dates included in metadata of the plurality of images stored in the storage unit 120 and time information (for example, a registration time in a webpage, SNS, or the like) associated with the plurality of corresponding images.

In this case, the control unit 150 may narrow the time interval for the search in the case of a childhood in which a change degree of a face is large according to the age. To this end, the control unit 150 preferably accurately sets (alternatively, inputs) the age (alternatively, a date of birth) of the reference image. For example, the control unit 150 may variably set the search interval like setting the search interval to 1 month and gradually increasing the search interval to 2 to 3 months in the case of children, setting the search interval to 1 year in the case of 10 years old or more, setting the search interval to 2 years in the case of 20 years old or more, setting the search interval to 5 years in the case of 30 years old or more, and the like.

As an example, the control unit 150 classifies 100,000 sheets of images according to 14 predetermined time intervals (including, for example, 1 month, 2 months, 3 months, 4 months, 5 months, 6 months, 7 to 12 months, 13 to 24 months, 25 to 48 months, 5 to 7 years old, 8 to 15 years old, 16 to 20 years old, 21 to 30 years old, 31 to 40 years old, and the like) based on photographing dates, webpage registration dates, SNS registration dates, and the like included in metadata of 100,000 sheets of images stored in the storage unit 120 (S220).

Thereafter, the control unit 150 performs the image tagging function between the reference image and the plurality of images included in the same time interval as the corresponding reference image among the plurality of images for each time interval.

That is, the control unit 150 calculates each of similarities between the face which is an object included in the reference image and faces which are objects included in the plurality of images included in the same time interval as the corresponding reference image, respectively, among a plurality of time intervals on the basis of the tag set in the reference image and verifies an image in which the calculated similarity for each of the plurality of images is a predetermined reference value or more.

Figure 3:
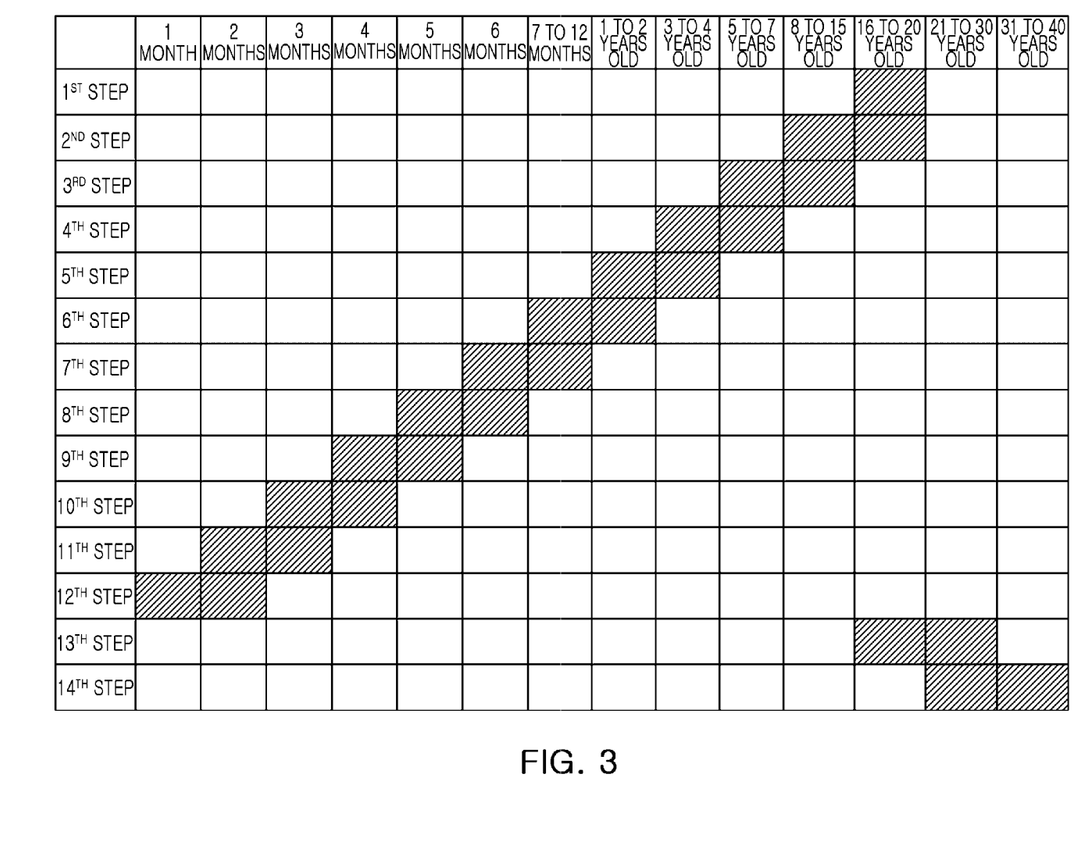
FIGS. 3 to 5 illustrate are diagrams illustrating a screen of user equipment according to an embodiment of the present invention.

As an example, as illustrated in FIG. 3, in a first step, the control unit 150 calculates each of the similarities between the face of the first user included in the reference image and faces included in 10,000 images included in a 12-th time interval (for example, 16 to 20 years old), respectively based on feature information of the face of the first user included in the reference image and feature information of the faces which are objects included in 10,000 images included in the 12-th time interval (for example, 16 to 20 years old), respectively with respect to 10,000 images included in the 12-th time interval (for example, 16 to 20 years old) corresponding to the age (for example, 17 years old) of the reference image among the plurality of time intervals and verifies 15 images of which the similarity among the calculated similarities of 10,000 images is a predetermined reference value (for example, a similarity of 90%) or more (S230).

Thereafter, the control unit 150 verifies (alternatively, extracts) feature information of objects included in the images of which the similarity is the reference value or more, respectively based on the images (alternatively, the images of which the similarity by performing the image tagging function is the reference value or more) of which the verified similarity is the predetermined reference value or more.

In addition, the control unit 150 reflects the feature information of the objects included in the images of which the verified similarity is the reference value or more, respectively to the feature information of the reference image to update the feature information of the reference image to be searched.

As an example, the control unit 150 verifies the feature information of objects included in 15 images having the similarity of the predetermined reference value (for example, the similarity of 90%) or more among the similarities of 10,000 images, respectively and updates the feature information (alternatively, the feature information of the face of the first user in the reference image) of the reference image based on the feature information of the objects included in the verified 15 images, respectively (S240).

Thereafter, the control unit 150 performs the image tagging function between the reference image (alternatively, the reference image of which the feature information is updated), and the plurality of images included in the same time interval as the reference image among the plurality of images for each time interval, and a plurality of other images included in an adjacent time interval of a search time direction from the same time interval as the corresponding reference image.

That is, the control unit 150 calculates each of similarities between the face which is the object included in the reference image and faces which are the objects included in the plurality of images included in the same time interval as the corresponding reference image and the plurality of other images included in the adjacent time interval of the search time direction from the same time interval as the corresponding reference image with respect to the plurality of images included in the same time interval as the reference image among the plurality of images for each time interval and the plurality of other images included in the adjacent time interval of the search time direction from the same time interval as the corresponding reference image based on the tag set in the reference image and verifies images in which the calculated similarity for each of the plurality of images and the calculated similarity for each of the plurality of other images are a predetermined reference value or more. In this case, the control unit 150 may calculate each of the similarities for the plurality of images included in the same time interval as the corresponding reference image and the plurality of other images included in the adjacent time interval of the search time direction based on the feature information of the reference image updated in the above step with respect to the reference image.

As an example, as illustrated in FIG. 3, in a second step, the control unit 150 calculates each of the similarities between the face of the first user included in the reference image and faces included in 10,000 images included in the 12-th time interval (for example, 16 to 20 years old), respectively based on the feature information (alternatively, the feature information of the face of the first user included in the updated reference image) updated for the face of the first user included in the reference image and the feature information of the faces which are the objects included in 10,000 images included in the 12-th time interval (for example, 16 to 20 years old), respectively with respect to 10,000 images included in the 12-th time interval (for example, 16 to 20 years old) corresponding to the age (for example, 17 years old) of the reference image among the plurality of time intervals and verifies 13 images of which the similarity among the calculated similarities of 10,000 images is a predetermined reference value (for example, a similarity of 90%) or more. Further, as illustrated in FIG. 3, in a second step, the control unit 150 calculates each of the similarities between the face of the first user included in the reference image and faces which are the object included in 9,000 images included in an 11-th time interval (for example, 8 to 15 years old), respectively based on the feature information (alternatively, the feature information of the face of the first user included in the updated reference image) updated for the face of the first user included in the reference image and feature information of the faces which are the object included in 9,000 images included in the 11-th time interval (for example, 8 to 15 years old), respectively with respect to 9,000 images included in the 11-th time interval (for example, 8 to 15 years old), other time interval adjacent to the 12-th time interval (for example, 16 to 20 years old) corresponding to the age (for example, 17 years old) of the reference image among the plurality of time intervals and verifies 10 images of which the similarity among the calculated similarities of 9,000 images is a predetermined reference value (for example, a similarity of 90%) or more (S250).

Thereafter, the control unit 150 verifies the feature information of the objects included in the images of which the similarity is the reference value or more, respectively based on the images of which the verified similarity is the reference value or more.

In addition, the control unit 150 reflects the feature information of the objects included in the images of which the verified similarity is the reference value or more, respectively to the feature information of the reference image to update the feature information of the reference image to be searched again.

As an example, the control unit 150 verifies the feature information of the objects included in 13 images having the similarity of the reference value or more (for example, the similarity of 90%) among the similarities of 10,000 images in the 12-th time interval (for example, 16 to 20 years old) and 10 images having the similarity of the similarity of the reference value (for example, the similarity of 90%) or more among the similarities of 9,000 images in the 11-th time interval (for example, 8 to 15 years old), respectively and updates the feature information (alternatively, the feature information of the face of the first user included in the reference image) of the previously updated reference image again based on the verified feature information of the objects included in a total of 23 images, respectively (S260).

Thereafter, the control unit 150 repeatedly performs the calculation of the similarity with the reference image of which the feature information is updated and the update of the feature information of the reference image (for example, steps S250 and S260) with respect to a plurality of yet other images included in the time interval at the previous step and yet another time interval adjacent to the time interval at the corresponding previous step among the plurality of time intervals to search each of one or more images of which the similarity is the reference value or more for each time interval with respect to the plurality of images included in the plurality of time intervals.

As an example, as illustrated in FIG. 3, in a third step, the control unit 150 calculates the similarities for each image based on the updated feature information (alternatively, the feature information of the face of the first user included in the updated reference image) of the face of the first user included in the reference image with respect to images included in a 10-th time interval (for example, 5 to 7 years old) which is another time interval and the images included in the 11-th time interval (for example, 8 to 15 years old) among the plurality of time intervals, verifies images having the similarity of a reference value or more among the calculated similarities for each image, verifies the feature information of the objects of the verified images, and updates the feature information of the previously updated reference image again based on the feature information of the objects included in the verified images, respectively. Further, the control unit 150 repeatedly performs steps 4 to 12 to search (alternatively, verify) each image which is similar to the feature information of the referenced image updated in each time interval by the reference value or more for each step (S270).

Thereafter, the control unit 150 automatically classifies one or more images searched for the plurality of time intervals, respectively and displays the one or more automatically classified images searched for the plurality of time intervals, respectively, the number of the images searched for each of the plurality of time intervals, and the like on the display unit 130.

In this case, when the one or more images searched for the plurality of time intervals, respectively are automatically classified for each time interval, the control unit 150 may classify all images into the image of the corresponding time interval or classify the image commonly included among the images searched through the consecutive steps, respectively into the image of the corresponding time interval with respect to the images searched through the consecutive steps, respectively.

Figure 4:
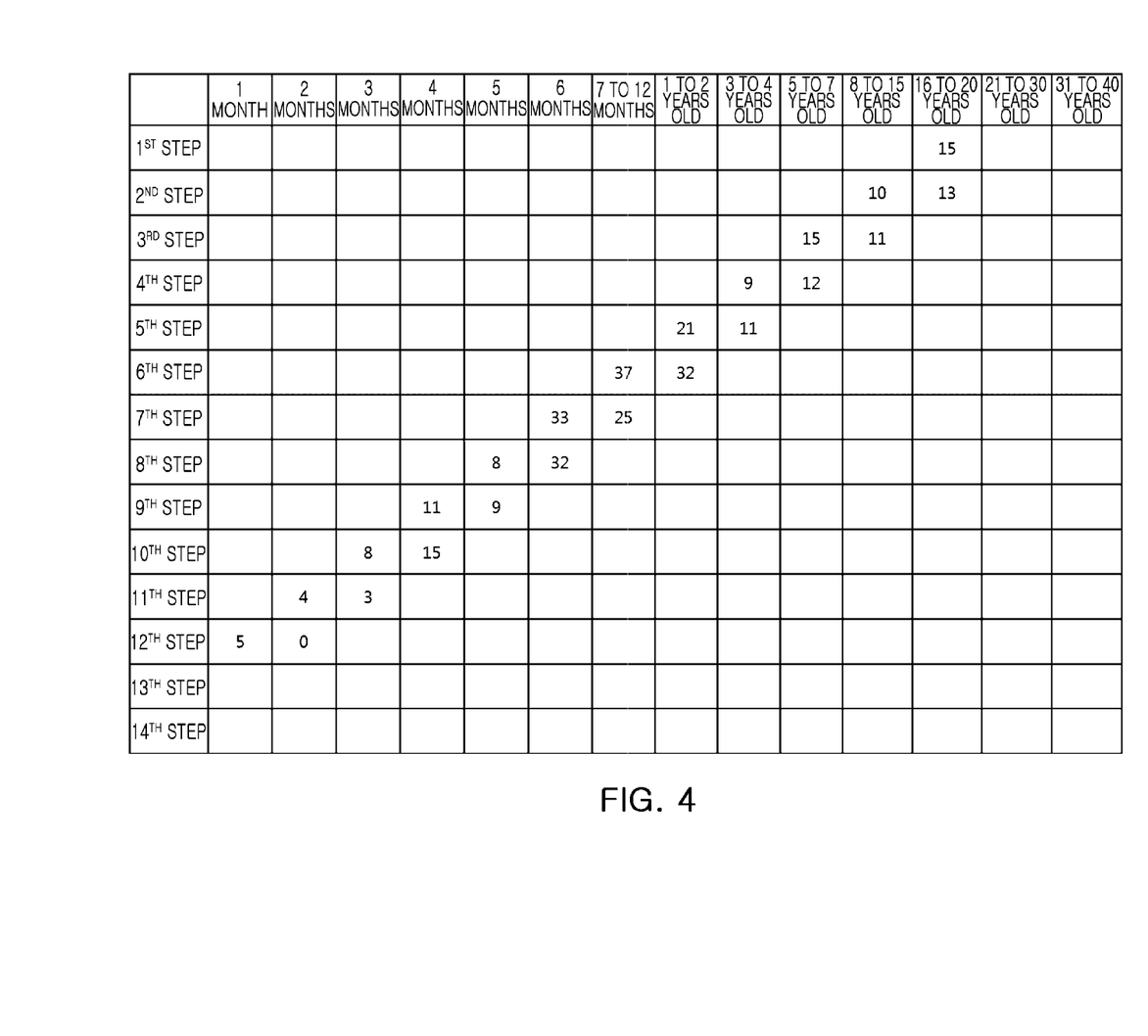

As an example, the control unit 150 automatically classifies one or more images searched for the plurality of time intervals for each time interval, respectively and displays the one or more automatically classified images searched for the plurality of time intervals, respectively, the number of the images searched for each of the plurality of time intervals, and the like on the display unit 130, as illustrated in FIG. 4. In this case, the control unit 150 may display one or more images of the time intervals, respectively in a thumbnail form and when a specific image displayed in the thumbnail form is selected, the control unit 150 may display an original image of the corresponding selected specific image on the display unit 130.

In this case, when one or more images searched for each of the plurality of time intervals are automatically classified for each time interval, the control unit 150 classifies all images (for example, a total of 18 images including the first to 18-th images) into the images of the corresponding 12-th time interval (for example, 16 to 20 years old) with respect to 15 images (for example, the first to 15-th images) searched in the first step and 13 images (for example, the first to 10-th images and 16-th to 18-th images) searched in the second step with respect to the 12-th time interval of 16 to 20 years old illustrated in FIG. 4.

Figure 5:
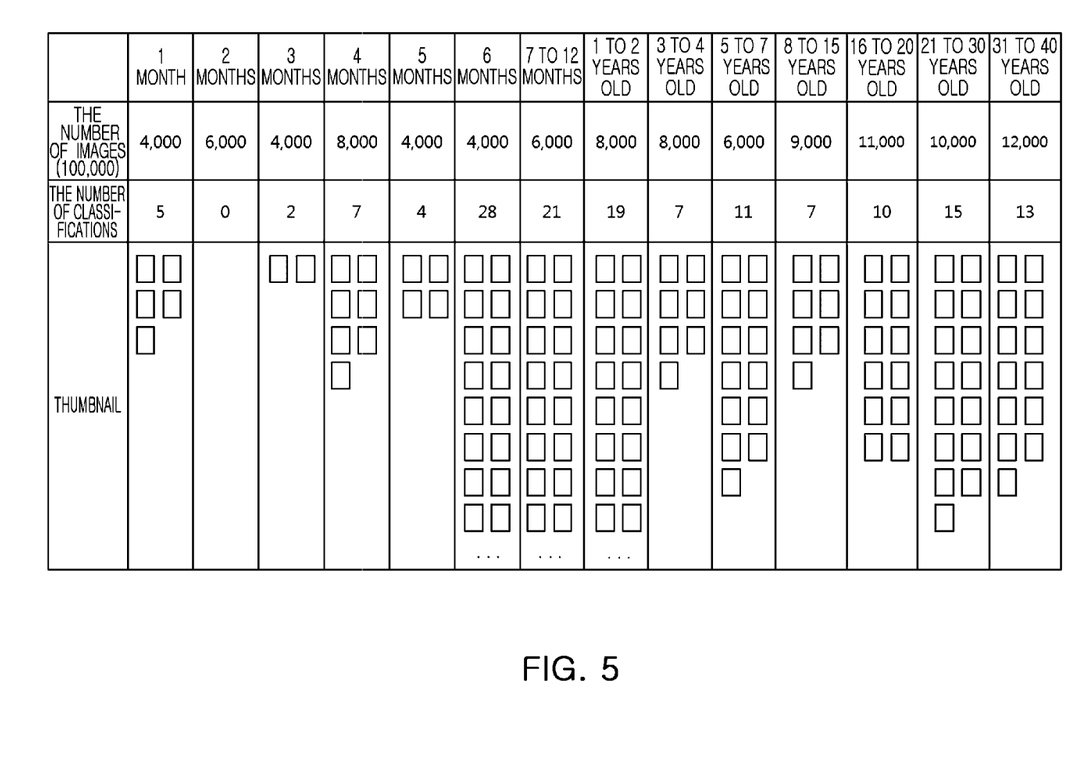

Further, when one or more images searched for each of the plurality of time intervals are automatically classified for each time interval, the control unit 150 classifies 10 images (for example, the first to 10-th images) commonly included in the first and second steps into the images of the corresponding 12-th time interval (for example, 16 to 20 years old) as illustrated in FIG. 5 with respect to 15 images (for example, the first to 15-th images) searched in the first step and 13 images (for example, the first to 10-th images and 16-th to 18-th images) searched in the second step with respect to the 12-th time interval of 16 to 20 years old illustrated in FIG. 4 (S280).

The use equipment according to the embodiment of the present invention may be prepared with a computer program, and codes and code segments configuring the computer program may easily deduced by a computer programmer in the art. Further, the corresponding computer program is stored in the non-transitory computer readable storage medium, and read and executed by the computer or the user equipment, and the like according to the embodiment of the present invention to implement the user equipment.

The non-transitory computer readable storage medium includes a magnetic storage medium, an optical storage medium, and a carrier wave medium. The computer program implementing the user equipment according to the embodiment of the present invention may be stored and installed in embedded memories of the user equipment, and the like. Alternatively, external memories such as a smart card storing and installing the computer program implementing the user equipment according to the embodiment of the present invention may be installed on the user equipment, and the like through an interface.

According to the embodiment of the present invention, as described above, the image at the specific time is searched by identifying and tracking the person included in the corresponding reference image among the plurality of images photographed at a predetermined time different than the photographing time of the corresponding reference image by using the reference image, and the search result is provided or the images are classified according to the search result to conveniently acquire a desired image search result through the reference image, thereby improving convenience of the user.

Further, in the embodiment of the present invention, as described above, when images which are changed with the passage of time are accumulated, an associated person is tracked and automatically tagged while reflecting a feature of a face which is changed only by an image at a single time to easily classify or search images stored in a cloud server or easily classify or associate images stored in various mass storage media.

In addition, in the embodiment of the present invention, as described above, when a vast image pool such as the Internet is present even in the case where an image of the same person is not present for each time period, similar faces are found from the corresponding images and a change of the corresponding similar faces over time is reflected to find the same person which is the same as a reference image from photographs at a substantially desired time, and as a result, it is available when there is not many images or missing children are found.

Hereinabove, although the present invention is described by specific matters such as concrete components, and the like, embodiments, and drawings, they are provided only for assisting in the entire understanding of the present invention. Therefore, the present invention is not limited to the embodiments. Various modifications and changes may be made by those skilled in the art to which the present invention pertains from this description. Therefore, the spirit of the present invention should not be limited to the above-described embodiments and the following claims as well as all modified equally or equivalently to the claims are intended to fall within the scope and spirit of the invention.

According to the present invention, the image at the specific time is searched by identifying and tracking the person included in the corresponding reference image among a plurality of images photographed at a predetermined time different than the photographing time of the corresponding reference image by using the reference image, and the search result is provided or the images are classified according to the search result to conveniently acquire the desired image search result through the reference image, thereby improving convenience of a user and the present invention can be widely used in a user equipment field, a image search field, and the like.

What is claimed is:

1. User equipment comprising:
   a storage unit configured to store a plurality of images classified for each time interval based on photographing dates included in metadata of the plurality of images, respectively, or time information associated with the plurality of images; and
   a control unit configured to:
   set a tag including an age and an identifier in a reference image,
   perform a first image tagging function between the reference image and a plurality of images included in a first time interval which is the same time interval as the reference image among the plurality of images for each time interval,
   extract feature information of objects included in images having similarities of a reference value or more, respectively based on images of which the similarities by performing the first image tagging function are the reference value or more, and
   update the feature information of the reference image to be searched by reflecting the extracted feature information of the objects included in the images having the similarities of the reference value or more, respectively to feature information of the reference image
   wherein the image tagging function includes calculating each of similarities between a face which is an object included in the reference image and faces which are the objects included in the plurality of images included in the first time interval, respectively based on the tag set in the reference image and verifying images of which the calculated similarity for each of the plurality of images is a predetermined reference value or more.

2. The user equipment of claim 1, wherein the control unit performs a second image tagging function between the reference image of which the feature information is updated and the plurality of images included in a first time interval, performs a third image tagging function between the reference image of which the feature information is updated and a plurality of other images included in a second time interval consecutive with the first time interval including the reference image among the plurality of images for each time interval, and reflects the feature information of the objects included in one or more images having the similarities of the reference value or more, respectively, to the feature information of the reference image of which the feature information is updated based on one or more images in which similarities by performing the second image tagging function and the third image tagging function is the reference value or more again to reupdate the feature information of the reference image of which the feature information to be searched is updated.

3. The user equipment of claim 2, wherein the control unit repeatedly performs the calculation of the similarities between at least one image included in two consecutive time intervals and the reference image of which the feature information is updated and the process of updating the feature information of the reference image with respect to the plurality of images classified for each time interval to search each of one or more images in which the similarities are the reference value or more for each time interval with respect to the plurality of images classified for each time interval.

4. The user equipment of claim 3, wherein the control unit classifies one or more images searched for each time interval, for each time interval, and controls the classified one or more images searched for each time interval and the number of images searched for each time interval to be displayed on a display unit.

5. The user equipment of claim 4, wherein the control unit classifies both of first one or more images and second one or more images searched through the consecutive searches, respectively with respect to the same time interval into images of the same time interval at the time of classifying one or more images searched for each time interval for each time interval.

6. The user equipment of claim 4, wherein the control unit classifies at least one image commonly included among both of first one or more images and second one or more images searched through the consecutive searches, respectively with respect to the same time interval into the images of the same time interval at the time of classifying one or more images searched for each time interval for each time interval.

7. A control method of user equipment, the method comprising:
   storing, by a storage unit, a plurality of images classified for each time interval based on photographing dates included in metadata of the plurality of images or time information associated with the plurality of images;
   setting, by a control unit, a tag including an age and an identifier in a reference image;
   performing, by the control unit, a first image tagging function between the reference image and a plurality of images included in a first time interval which is the same time interval as the reference image among the plurality of images for each time interval;
   extracting, by the control unit, feature information of objects included in images having similarities of a reference value or more, respectively based on images of which the similarities by performing the first image tagging function are the reference value or more; and
   updating, by the control unit, the feature information of the reference image to be searched by reflecting the extracted feature information of the objects included in the images having the similarities of the reference value or more, respectively to feature information of the reference image,
   wherein the performing of the first image tagging function includes:
      calculating, by the control unit, each of similarities between a face which is an object included in the reference image and faces which are the objects included in the plurality of images included in the first time interval, respectively based on the tag set in the reference image; and
      verifying, by the control unit, images in which the calculated similarity for each of the plurality of images is a predetermined reference value or more.

8. The method of claim 7, further comprising:
   performing, by the control unit, a second image tagging function between the reference image of which the feature information is updated and the plurality of images included in a first time interval and performing a third image tagging function between the reference image of which the feature information is updated and a plurality of other images included in a second time interval consecutive with the first time interval including the reference image among the plurality of images for each time interval;
   reflecting, by the control unit, the feature information of the objects included in one or more images having the similarities of the reference value or more, respectively, to the feature information of the reference image of which the feature information is updated based on one or more images in which similarities by performing the second image tagging function and the third image tagging function is the reference value or more again to reupdate the feature information of the reference image of which the feature information to be searched is updated;
   repeatedly performing, by the control unit, the calculation of the similarities between at least one image included in two consecutive time intervals and the reference image of which the feature information is updated and the process of updating the feature information of the reference image with respect to the plurality of images classified for each time interval to search each of one or more images in which the similarities are the reference value or more for each time interval with respect to the plurality of images classified for each time interval;
   classifying, by the control unit, one or more images searched for each time interval, for each time interval; and
   displaying, by a display unit, the classified one or more images searched for each time interval and the number of images searched for each time interval.

9. A non-transitory computer readable storage medium having a computer program recorded thereon, when executed, arranged to cause a user equipment to perform a method comprising:
   storing, by a storage unit, a plurality of images classified for each time interval based on photographing dates included in metadata of the plurality of images or time information associated with the plurality of images;
   setting, by a control unit, a tag including an age and an identifier in a reference image;
   performing, by the control unit, a first image tagging function between the reference image and a plurality of images included in a first time interval which is the same time interval as the reference image among the plurality of images for each time interval;
   extracting, by the control unit, feature information of objects included in images having similarities of a reference value or more, respectively based on images of which the similarities by performing the first image tagging function are the reference value or more; and
   updating, by the control unit, the feature information of the reference image to be searched by reflecting the extracted feature information of the objects included in the images having the similarities of the reference value or more, respectively to feature information of the reference image,
   wherein the performing of the first image tagging function includes,
      calculating, by the control unit, each of similarities between a face which is an object included in the reference image and faces which are the objects included in the plurality of images included in the first time interval, respectively based on the tag set in the reference image; and verifying, by the control unit, images in which the calculated similarity for each of the plurality of images is a predetermined reference value or more.

\* \* \* \* \*